June 21, 1932. O. M. TUCKER ET AL 1,864,278
METHOD OF GETTING AND DELIVERING FORMED CHARGES OF VISCOUS GLASS
Original Filed Nov. 1, 1918 3 Sheets-Sheet 1
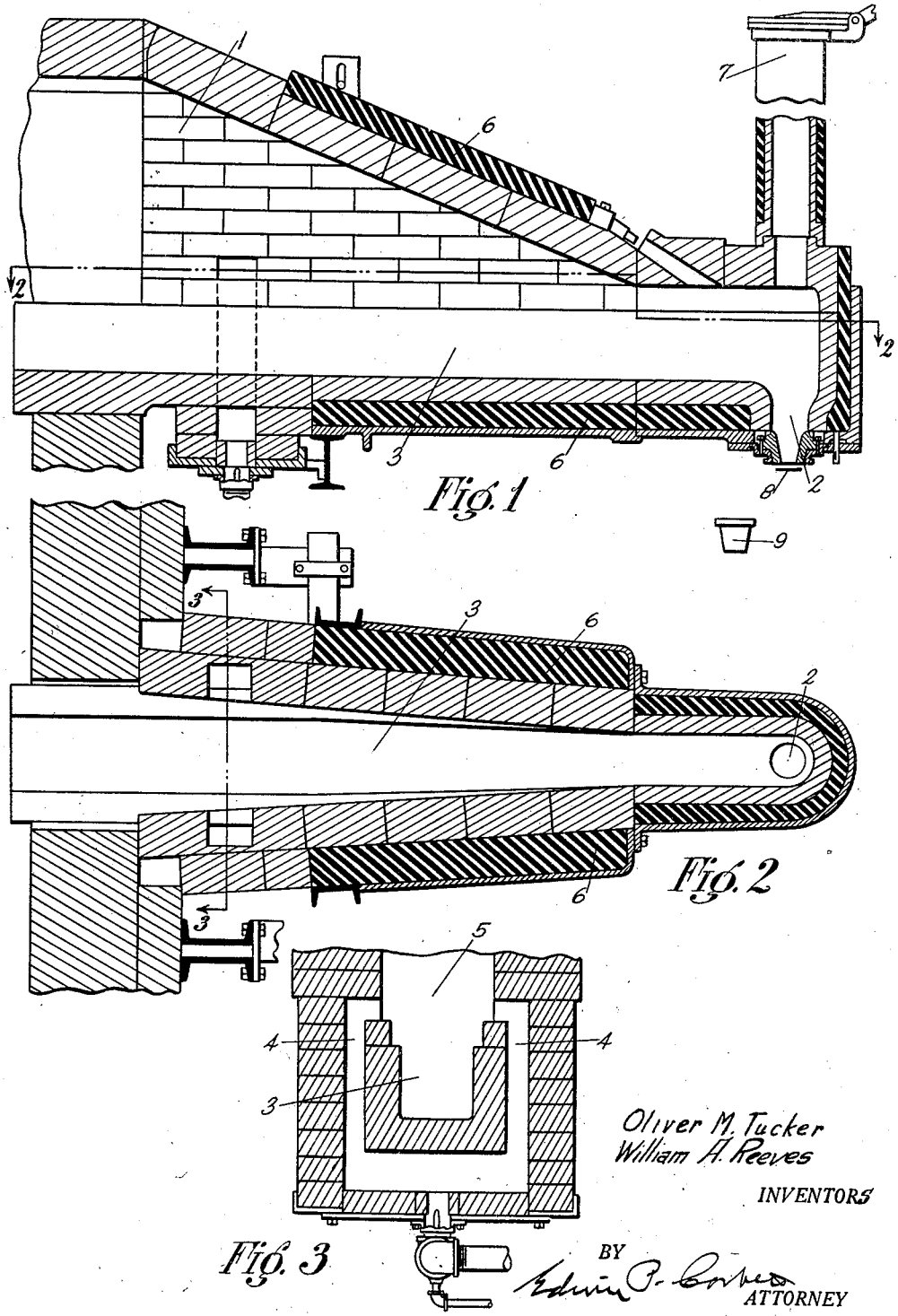

June 21, 1932.   O. M. TUCKER ET AL   1,864,278
METHOD OF GETTING AND DELIVERING FORMED CHARGES OF VISCOUS GLASS
Original Filed Nov. 1, 1918   3 Sheets-Sheet 3

Oliver M. Tucker
William A. Reeves   INVENTORS
BY
ATTORNEYS.

Patented June 21, 1932

1,864,278

UNITED STATES PATENT OFFICE

OLIVER M. TUCKER AND WILLIAM A. REEVES, OF COLUMBUS, OHIO, ASSIGNORS, BY MESNE ASSIGNMENTS, TO HARTFORD-EMPIRE COMPANY, OF HARTFORD, CONNECTICUT, A CORPORATION OF DELAWARE

METHOD OF GETTING AND DELIVERING FORMED CHARGES OF VISCOUS GLASS

Original application filed November 1, 1918, Serial No. 260,758. Divided and this application filed November 26, 1924. Serial No. 752,378. Renewed June 5, 1930.

Our invention relates to a method of getting and delivering formed charges of viscous glass for subsequent pressing, molding, blowing or otherwise treating. It consists in more than merely getting and delivering charges of proper weight. It comprises getting and delivering charges which are preformed as to shape and dimensions and particularly preformed to suit the shape and dimensions of the interior of their treating receptacles, being so preformed and delivered without being marred.

In the prior art, it has been customary to obtain charges of viscous glass for subsequent pressing, molding, or blowing by three well-known methods, that is, the hand method, the suction method, and the flowing stream method.

In the hand method, which has been generally used in the production of higher classed ware, the glass is gathered from a viscous mass by inserting a headed rod thereinto and manipulating together a lump thereon. The rod is then withdrawn and held stationary over the mold so that the lump will sag into the mold whereupon, the neck between the head of the rod and the lump is severed. This method, when properly performed, produces glass charges that approximate the ideal but it requires skilled labor and is costly.

In the suction method, a blank mold is dipped into a viscous glass bath and gathers a charge by means of a partial vacuum therein. The blank mold is then raised and the contained charge severed from the bath, preliminary to placing the blank into the forming mold. The method is valuable for certain classes of ware but has serious limitations. For instance, it has never been successful in the making of pressed ware. Furthermore, the apparatus is necessarily very expensive.

In the flowing stream method, the charges are obtained by flowing glass from viscous mass through a spout, the glass being maintained in such a high temperature that it pours into the molds just as one would pour molasses from a pitcher into a tumbler. The molds are usually successively presented by a step-by-step movement and the continuously pouring stream of glass is cut at intervals synchronizing with the mold movements. Usually each lower end of the flowing stream is supported during mold movements by the knives. This may affect the shape or size of the lower end of the charge before it breaks into a stream. The weights of the charges are regulated by a throttling plug or gate which regulates the area of the delivery orifice and, therefore, regulates the cross section of the stream from time to time. This method is cheaper than the hand method but the thin stream coils both on the knives and in the molds and the laps and coils thus produced do not fully unite in pressing or blowing. The result is that bubbles and creases appear in the finished product and for this reason, the flowing stream has never fully replaced the hand method.

Our method approaches the problem in a different way. We extrude en bloc charges of proper weight and sever them before they string out. What is more important, we preform the charges as to shape and dimensions so that when deposited, they will settle without lapping, coiling or folding. This may be termed settling vertically and distending laterally and we insure attainment thereof either by the dimensions of the charge itself or by those dimensions with relation to the dimensions of the mold interior. In other words, we distend laterally even without lateral support; or we may produce charges of horizontal cross section calculated to approximate the interior cross section of the molds being fed and thus be prevented from lapping, coiling or folding by the mold walls. The severing is effected before the extruded glass materially loses the shape and dimensions that have been impressed upon it by and during the extruding action. Then we deliver the charge to the treating receptacle in such a manner that it will settle without lapping, coiling or folding and is neither marred nor materially varied in shape and dimensions.

In the handling of viscous glass and the separation of charges from a mass thereof, new elements enter into the question of control, particularly when one is seeking to preform charges as well as to secure charges of proper weight. The mass of viscous glass in a furnace is constantly changing in volume and character. More explicitly, it frequently changes in depth, temperature, and consistency and all of these things affect its rate of movement through a delivery orifice.

Our invention comprises a method of adjustably controlling both the glass and the apparatus which delivers and cuts it. Thus, the effect of any change in the volume and character of the successive charges of glass may be neutralized or utilized advantageously while, at the same time, various other adjustments of the glass and apparatus controls may be made to compensate or to even vary the results as desired. It will shortly appear that, under our method, the various steps or series of steps of control are balanced against each other in different ways to maintain the volume and character of the successive glass charges or may be balanced against each other to attain similar or different results.

This application is a division of our co-pending application, Serial No. 260,758, filed November 1st, 1918, Method of getting and delivering formed charges of viscous glass.

In performing our method, certain apparatus is necessary and the basic element of the apparatus that we preferably use is a spout connected to a glass furnace and fed therefrom, such spout having an aperture in the outer end of its base which is always covered with a head of glass and beneath which is a disappearing closing means and a periodically operating severing means closely adjacent thereto.

Our present invention relates to a series of controls acting upon the glass singly or in combination whereby a new shaping of the successive charges of glass is obtained or a charge of a certain shape, weight and dimension is maintained. It has to do particularly with the regulation of the temperature of the glass alone and in combination with other controls to produce a change in or maintain the shape, weight and dimensions of a series of successive charges.

The apparatus is illustrated in the accompanying drawings wherein similar characters of reference designate corresponding parts and wherein:

Figure 1 is a vertical section, in elevation, of our improved apparatus.

Figure 2 is a section taken on line 2—2 of Figure 1.

Figure 3 is a section taken on line 3—3 of Figure 2 and illustrating a part of the apparatus for variably controlling the temperature of the glass in the spout.

Figure 4:
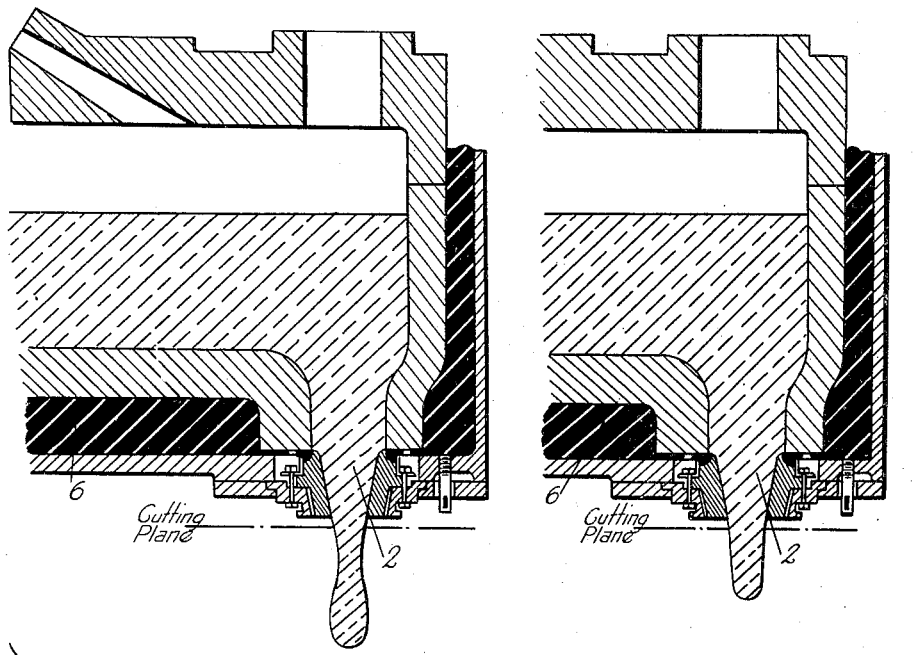
Figure 4 is a multiple section view illustrating the different extrusion actions of the glass at different temperatures. The right hand view of Figure 4 illustrates the effect upon the shape, weight and dimensions of the successive charges of a decrease in the temperature of the glass, other factors including the cutting plane, head pressure and starting plane remaining the same.

In the drawings it will be noted that a spout 1 is provided with an orifice 2 and a channel 3 for conducting viscous glass from the furnace to such orifice. The spout is further provided in its walls with channels 4 that ramify to various points adjacent the channel 3 and that also lead to a zone immediately above the glass adjacent the juncture of the spout with the furnace and within the spout hood 5. These channels 4 are adapted to be fed with a heating or cooling fluid and to conduct the same into contact with the walls of the channel and to a zone above the glass in channel 3 at its juncture into the furnace. The spout 1 is carefully insulated as at 6 to retain the heat. Also, its outer end is provided with a valve-controlled stack 7 so that any desired amount of heat may be drawn through from the furnace into prolonged contact with the glass in the spout.

The spout channel 3 is of a depth to permit variation of the head of glass above the delivery orifice 2.

Operating in conjunction with the spout 1 is a pair of shears 8. These shears are automatically operable at regular intervals to sever glass extruded from the delivery orifice of the spout at points closely adjacent to such delivery orifice. They are adjustable towards and from said delivery orifice and, of course their frequency of operation may be varied.

There is also a disappearing combustion cup 9 used in the performance of our method. It is fed with gas and air burning therein under pressure and is designed to automatically cover the spout delivery orifice from beneath immediately after each severing operation and remain in this position for variable periods of time. During the periods of covering, the gaseous fluid is not only introduced to the cup under pressure but it burns therein under pressure due to the very slight outlet for the products of combustion. The pressure of the gas burning within the cup may be varied either by varying the pressure at which it is introduced or by varying the outlet from the cup.

The primary steps of our method have been set forth in our preceding application for patent, filed September 16, 1916, Serial No. 120,429. Briefly stated, they comprise the following:

Usually, a delivery orifice with an area slightly less than the molds to be filled is chosen for the spout. The relation of the orifice to the molds, in which the charges are to be fabricated, according to our invention, may be varied in such manner that these charges when delivered to the molds settle without lapping, coiling or folding. For example, where wide low molds are used, we use a large orifice so that a suitable compact charge will be formed of such weight, shape and dimensions as to properly charge the mold and the charge will settle in the mold without any laps, coils or folds; and where tall narrow molds are used, then we use a smaller sized orifice to get charges that are suitable in cross-section for such narrow tall molds and which will settle therein without laps, coils or folds.

There is maintained above the delivery aperture a sufficient head of glass to ensure a rate of extrusion approximating the rate of fall of the already extruded glass from the time extrusion starts until the charge is severed. After each severing action, the combustion cup moves into capping relation to the delivery orifice and stops extrusion for any predetermined period of time, after which it completely uncovers the orifice. Meanwhile, severing is occurring at regular intervals. Thus, there is a new extrusion for each charge. And, since the instant that extrusion starts may be varied by varying the period of covering without varying the frequency of cutting, the period of extrusion may be readily changed. The control of the feed period may and usually does involve the retarding of the glass flow and may also include stopping the flow. Now, assuming other controls to be constant and that the period of stopping the flow be varied, increasing the length of the stoppage period will generally result in a shorter charge, while shortening the period of stoppage will generally result in a longer charge because the flow period is inversely affected by changes in the length of the stoppage period.

In previous applications we have dwelt mainly on the primary steps of control, that is, the unthrottled aperture of selected dimensions to form the charges and the period of extrusion variable independently of the frequency of cutting to measure the charge.

It has already been made clear, however, that we combine these primary steps of control with certain supplementary steps of control. The practical methods of accomplishing this follow.

By the use of our improved spout structure we may vary the temperature and condition at which the glass reaches the delivery orifice. In fact, the temperature and therefore the condition of the glass may be effectively controlled at practically any point in the spout by means of the channels 4, stack 7 and combustion cup 9. In this way, even when the glass in the furnace is too hot or too cold, the glass may be acted upon at any instant or instants after it enters the spout by a heating or cooling medium with the result that it is delivered from the delivery aperture at ideal temperature and proper condition. Assuming the glass to be at a working temperature and other controls to remain constant, if the temperature of the glass in the spout be raised, then generally the glass will tend to flow more freely and the charges will become longer, more tapered, or thinner in cross-section. If, on the other hand, the temperature is lowered the charges will become shorter and thicker, i. e., to more nearly approach the cross-section of the outlet. For example, the left hand view in Fig. 4 indicates a shape which may be formed from hot glass, while the right hand view of Fig. 4 indicates a shape that may be obtained by using a colder glass.

Figure 5:
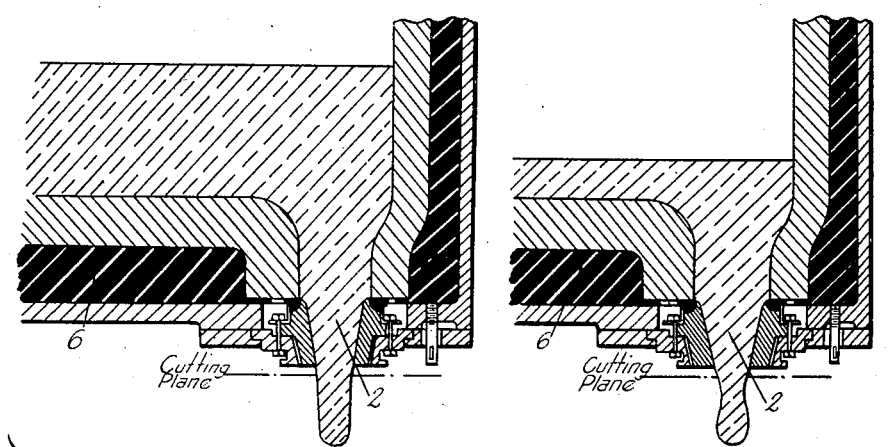
Figure 5 is a multiple section view illustrating the different extrusive actions of the glass at different head pressures, the right hand view illustrating the effect upon the shape, weight and dimensions of the charge of a relatively extreme lowering of the depth of the glass, other factors remaining constant.

We may vary the extrusive pressure of the glass by varying the level of the glass in the furnace and therefore the head of glass above the delivery orifice. The same result may be effected by varying the quantity of glass admitted to the spout from the furnace in a given period of time. Or we may utilize a displacement plunger or fluid pressure to accelerate the extrusive action of the glass. The primary use of this capability of variation is to enable us to produce a longer charge without a neck in it. Where the other controls are constant, the increase of extrusive pressure usually results in tending to make the charges more straight-sided and also tends to delay the necking-in action, and also in lengthening the charge; while decreasing the extrusive pressure has the opposite effect, namely, to make the charges more pointed, shorter in length and more tendency to neck in when any substantial length charge is being made. For example, in the left hand view of Fig. 5 is shown the effect of increased extrusive pressure, while the right hand view illustrates an effect due to a less extrusive pressure.

We may vary the position of the glass in the orifice at the moment extrusion starts. This, we may accomplish by varying the pressure of the burning gases within the combustion cup during the time the delivery orifice is capped. The detailed structure and variable operation of our combustion cup is more fully set forth in our preceding application for patent, Serial No. 120,429, but it is sufficient for an explanation of the present method to state that the position of the cup with relation to the discharge aperture, the period of coverage, and the pressure of the burning gases within the cup, can be so varied that first, the glass extruding from the feed aperture is balanced and halted in its movement; or second, the normal movement of the glass in the aperture is reversed and this glass driven up in the aperture; or third, to permit a further extrusion of the glass after cutting before material retarding or stoppage occurs.

Figure 6:
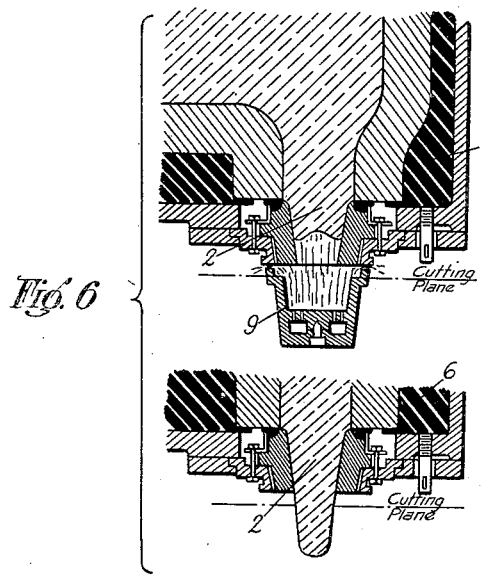
Figure 6 is a multiple section view illustrating one action of the combustion cup in stopping the glass and the subsequent extrusion which results, the glass in this figure being forced back to some extent within the delivery orifice.

The starting position of the glass may also be varied by varying the relation of the severing plane to the delivery orifice. Where other controls are constant, and the starting position of the glass relatively to the lower end of the outlet spout is varied, changes in the charge are brought about. Where the glass has been cut and the stub is driven back up into the orifice by pressure due to operation of the combustion cup to produce this action, the charge will usually be shorter with a rounded or spherical lower end and straight sides, as is illustrated in Fig. 6. If, however, the starting position is lowered, then the charge usually is longer and more pointed. Usually the changing of the starting position changes both the weight and dimensions of the charge, that is, where the starting position is raised, the charges are usually decreased in weight, while the lowering of this plane usually increases the weight of the charges.

It will be obvious that, with other conditions constant, an extrusion from entirely within the orifice will result in a lesser weight of glass being delivered than if the extruded column already partially protruded from the delivery orifice. What is not so obvious, but is nevertheless a fact, is that changing the starting point of the extrusion will also change its shape and dimensions, if other conditions are constant. Realizing this, we variably control the position of the glass at the instant extrusion starts and thereby variably control the weight, shape and dimensions of the charges.

The combustion cup is also effective to reshape the end of the glass from which the charge has been severed and, if desired, to produce straight-sided charges. When it assumes operative position, it brings a static fluid pressure at high temperature to bear upon the end of the portion next to be extruded. The result is that the portion is supported in chosen position in such a manner that its end is positively shaped. This shaping action is particularly desirable due to the tendency of the knives to squeeze the column of glass into elliptical form and due to the irregularities which inevitably occur from the shearing action.

What actually happens is so peculiar that an explanation is deemed well worth while. The portion of glass within the delivery aperture is higher in temperature at its center than at its sides. Consequently, when the burning fluid under pressure is applied the center of the glass is smoothed out if necessary and is forced up until the lower end of the column is smooth and concave. In the meantime, the sides of the column have not receded, at least not as much as the central core which is hotter and more mobile. Thus, when the combustion cup is removed, the sides of the glass get an earlier start in the extrusive movement but are gradually overtaken by the core whose smooth concave lower end finally becomes the smooth convex lower end of the charge being formed. Because the core has a higher starting point, a longer interval of time will intervene before the core can overtake and pass the sides and finally become a dropping pendulous weight pulling down upon and contracting the sides of the extrusion. This delaying effect not only affects the shape of the end of the column but maintains its sides straight.

Our combustion cup further amplifies this action by the lubricating effect which it has upon the walls of the delivery aperture. It applies an intense heat to the bottom of the aperture bushing and, in some cases, even directly upon the inner walls of such bushing. The result is that friction between the walls of the bushing and the glass is reduced so that the sides of the extrusion will move more freely and extrude further before a neck starts to form.

We may vary the relation of the severing plane to the delivery orifice by raising or lowering the knives. Thus, under certain conditions lowering of the knives may lengthen the charges and raising of the knives may act conversely. Or raising of the knives may, where the charges are being formed with necks, serve to eliminate these necks. If the glass is cut lower, there will be a longer stub of glass depending from the orifice before each cutting.

It will be understood that, while we have described the effect of varying one control step at a time, that in carrying out our invention any or all these control steps may be varied to produce charges of desired weight, shape and dimensions. Where this is done, the actions are combined in such way that each affects the other. For example, where the extrusive pressure is lowered and the cutting plane is lowered, bulbous or globular charges may be formed; where the temperature is raised and the shears are lowered, long pointed charges may be made; or where the temperature is lowered and the shears raised, short "squatty" charges may result, and so on through a great range of variations in weight, shape and dimensions of charges which may be accomplished by our method of regulating the several control steps in various combinations.

From the above, it will be seen that one or more of the various controls can be utilized and supplemented by the remaining controls. Adjustment of one control while the others remain unchanged give the desired result; or it may be necessary to adjust several or all of the controls in order to maintain the shape, weight and dimensions of the successive charges or to produce a series of charges of a new shape, weight and dimension to fit a new set of receiving receptacles. The several controls with the wide range of adjustment of each control and their cooperative relation, makes possible a myriad of changes in weight, shape and dimensions of the charges. Some of the controls may be used to perform double functions, but they each have some functions which, either independently or cooperatively, act upon the glass to produce new results.

More specifically, and by referring to the figures, it will be obvious that the adjustment of one factor or control under a certain definite set of conditions will act upon the glass to maintain, or produce a definite change in the shape, weight and dimensions of the charge. But it will be further obvious to those skilled in the art that with conditions slightly changed or with a cooperative change in one or all of the other controls, the same control adjustment will produce a different effect upon the shape, weight and dimensions of the charge. For instance, by referring to Figure 4 of the specification, it will be seen that, with other controls in a certain position and constant, the temperature of the glass may be lowered a certain amount until the charge shown in the left hand view of Figure 4 will be changed to the form of the charge shown in the right hand view of Figure 4, which may or may not be the shape of charge desired. If the conditions of the furnace were such that the temperature could not be lowered, then the other controls, such as starting point of extrusion, cutting plane, or extrusive pressure may be combined in various degrees to produce the charge shown in the right hand view of Figure 4.

Or again, referring to Figure 5, and assuming that the charge shown in the left hand view is the form desired, it may be that for some reason, the level of the glass in the tank is lowered to the depth shown in the right hand view of Figure 5. Then, to maintain the form of charge shown in the left hand view of Figure 5, it may be necessary only to lower the temperature of the glass or, it may be necessary to change the starting plane of the glass to different heights according to the temperature of the glass in the spout, or it may be necessary to adjust the temperature, starting plane and severing plane in order to compensate for the drop in the depth of the glass and to maintain the shape, weight and dimensions of the charge shown in Figure 5. Or again, referring to Figure 5, it may be desired to change the form of the charge shown in the left hand view of Figure 5 to suit a new set of molds and it may be that by merely lowering the head of the glass a certain amount, as shown in the right hand view of Figure 5, the desired change may be produced with other conditions remaining constant.

Figure 7:
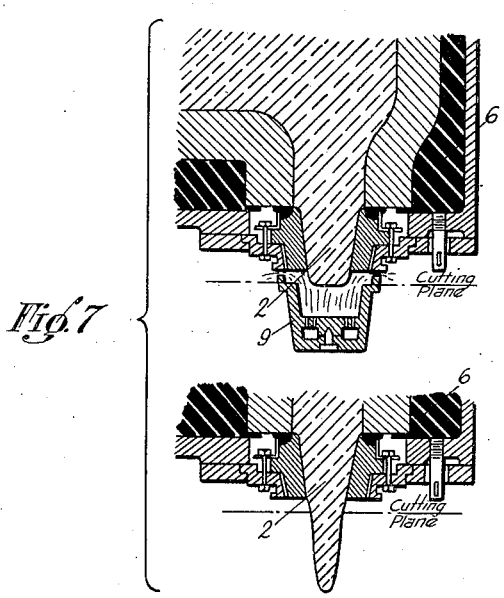
Figure 7 is a multiple section view illustrating another action of the combustion cup in stopping the glass and the subsequent extrusion which results, the starting plane in this figure being lower than the starting plane in Figure 6 with the result of a change in the shape, weight and dimensions of the successive charges.

Or again, let us assume that the charge being produced is of the form shown in the right hand view of Figure 5 and with the starting plane as shown in Figure 6. Then in order to produce a new charge of the form shown in Figure 7, it may be necessary to increase the head of glass slightly and to lower the starting plane of the glass, as shown in Figure 7, in order to change the shape, weight and dimensions of the successive charges to assume the form shown in the bottom view of Figure 7. Or it may be that charges are being produced of the form shown in Figure 6 with a relatively high starting plane and for some reason the temperature of the glass is lowered, then in order to maintain this form of charge, the operator may gradually lower the starting plane to compensate for this change in temperature. Or he may be required to combine with his adjustment of the starting plane a raising or lowering of the shearing plane in order to maintain this certain form of charge.

Figure 8:
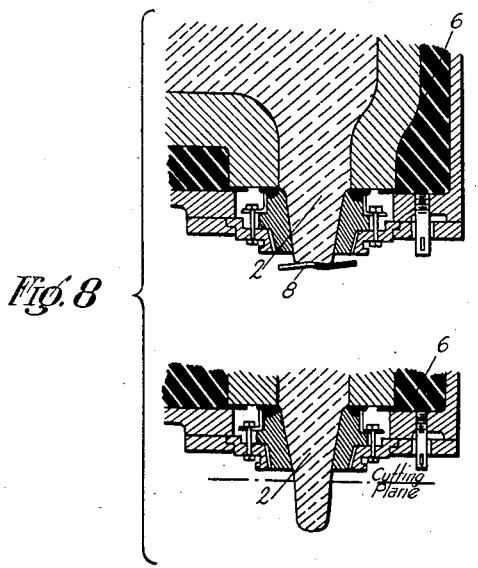
Figure 8 is a multiple section view illustrating one action of the severing device and the subsequent extrusion which results.
Figure 9:
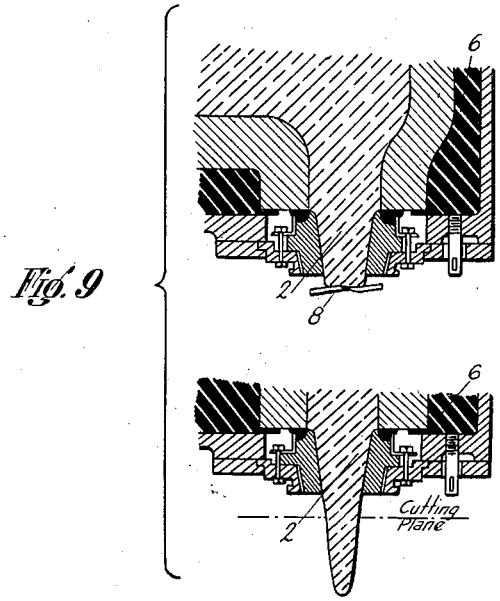
Figure 9 is a multiple section view illustrating another action of the severing device and the subsequent extrusion which results, the severing plane in Figure 9 being lower than that shown in Figure 8 with a resulting change in the shape and dimensions of the respective charge, other conditions remaining constant.

Or again, referring particularly to Figures 8 and 9, it will be seen that under certain conditions, a lowering of the shearing plane will change the shape and dimensions of the charge shown in Figure 8 to that shown in Figure 9. It will be obvious that a slightly different adjustment of the shearing plane will produce a still different effect upon the shape and dimensions of the charge. It will be further obvious that if the lowering of the shearing plane, shown in Figure 9, is accompanied by a change in temperature, a charge of different shape and dimensions will be produced than that shown in Figure 9.

The changes that may be required to meet all variations of working conditions cannot be detailed for they are too numerous. It will be obvious from the few changes illustrated in the drawings that an almost innumerable number of changes may be produced in the shape, weight and dimensions of the charges by permutation of the various adjustable controls. The point is that a bushing of a certain shape and dimension be selected for a certain range of ware. Then the primary and supplementary controls are set with relation to each other to get formed charges of the desired weight, shape and dimensions. When required, these controls may be adjusted individually or collectively to either maintain or vary the weight, shape or dimensions of the charges.

Although it will be obvious that the weight, shape or dimensions of the successive charges may be varied or maintained independently or simultaneously, it is believed that if it is stated that the charges are of such dimensions that they will settle in the mold without coiling, lapping or folding, this term "dimensions" will cover both the proper weight and shape of such charges, and the claims have been worded accordingly.

It has been pointed out above, and it is to be particularly noted as characterizing our invention, that each preformed mold charge is capable of being severed while it is unsupported from beneath, and is customarily so severed in suspension; and that the orifice through which the glass is delivered is constantly submerged by the body of molten glass which is superimposed upon the delivery orifice. It will be understood that our invention is not restricted to the use of the particular apparatus details disclosed herein and that no limitations are to be imposed upon our invention except such as are indicated in the appended claims.

Having thus described our invention, what we claim is:

1. In the manufacture of glassware, the method of delivering, to successively presented molds, continuous series of uniform lump charges of molten glass of shape and weight appropriate to the particular molds to be fed, which method comprises superimposing a sufficient head of molten glass, of proper viscosity, upon a delivery orifice of a proper contour and area to permit the feeding of charges appropriate to the molds to be fed, and for each mold charge, discharging the glass through said orifice, severing the discharged glass before it develops into a stream, and controlling the movement of glass in the delivery orifice to determine the weight and shape of the severed mold charge by regulating the temperature of the glass.

2. In the manufacture of glassware, the method of delivering, to successively presented molds, continuous series of lump charges of molten glass preformed so that they will settle in the molds without lapping, coiling or folding when delivered, which method comprises superimposing a mass of molten glass upon a delivery orifice which is so predetermined as to contour and area that a proper weight charge can be formed and delivered without lapping, coiling or folding, extruding the glass through said orifice, severing each extrusion before it develops into a stream, and regulating the temperature of the glass to regulate the charges as desired.

3. In the manufacture of glassware, the method of delivering, to successively presented molds, continuous series of uniform lump charges of molten glass of shape and weight appropriate to the particular molds to be fed, which method comprises superimposing a sufficient head of molten glass, of proper viscosity, upon a delivery orifice of a proper contour and area to permit the feeding of charges appropriate to the molds to be fed, discharging the glass through said orifice, periodically severing the discharged glass before it develops into a stream, and maintaining the dimensions of the severed mold charges substantially constant by varying the temperature of the glass supplied to the discharge orifice to counteract the effect upon the dimensions of the mold charges of any other factor affecting the dimensions of the charges, including variation in the height of the severing plane, variation in the effective extrusive pressure producing the discharges, variation in the rate of discharge, variation in the frequency of discharge, and variation in the duration of the period of discharge.

4. In the manufacture of glassware, the method of delivering, to successively presented molds, continuous series of uniform lump charges of molten glass of shape and weight appropriate to the particular molds to be fed, which method comprises superimposing a sufficient head of molten glass, of proper viscosity, upon a delivery orifice of a proper contour and area to permit the feeding of charges appropriate to the molds to be fed, discharging the glass through said orifice, periodically severing the discharged glass before it develops into a stream, and producing mold charges of different dimensions by varying the temperature of the glass supplied to the discharge orifice.

5. In a method of separating molten glass into preformed lump charges which comprises extruding the glass through an aperture and periodically severing mold charges from the extruded glass of such dimensions that each will settle in a mold without coiling, lapping or folding, the step of changing the mold-charge dimensions by varying the temperature of the glass while maintaining the effective extrusive pressure of each extrusion substantially constant.

In testimony whereof we hereby affix our signatures.

OLIVER M. TUCKER.
WILLIAM A. REEVES.